(12) United States Patent
Hanawa et al.

(10) Patent No.: US 11,414,300 B2
(45) Date of Patent: Aug. 16, 2022

(54) DAMPER FOR ELEVATOR, AND ELEVATOR

(71) Applicant: Mitsubishi Electric Corporation, Chiyoda-ku (JP)

(72) Inventors: Yutaro Hanawa, Chiyoda-ku (JP); Hisashi Furuzawa, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 577 days.

(21) Appl. No.: 16/081,232

(22) PCT Filed: Feb. 3, 2017

(86) PCT No.: PCT/JP2017/003942
§ 371 (c)(1),
(2) Date: Aug. 30, 2018

(87) PCT Pub. No.: WO2017/179270
PCT Pub. Date: Oct. 19, 2017

(65) Prior Publication Data
US 2019/0084802 A1   Mar. 21, 2019

(30) Foreign Application Priority Data

Apr. 14, 2016   (JP) ............................. JP2016-080818

(51) Int. Cl.
*F16F 1/37* (2006.01)
*F16F 7/12* (2006.01)
(Continued)

(52) U.S. Cl.
CPC ................ *B66B 5/282* (2013.01); *B66B 5/28* (2013.01); *F16F 1/37* (2013.01); *F16F 7/12* (2013.01); *F16F 7/124* (2013.01); *B32B 5/18* (2013.01)

(58) Field of Classification Search
CPC .......... F16F 1/37; F16F 1/3713; F16F 1/3716; F16F 2224/0225; F16F 7/12; F16F 7/123; F16F 7/124; F16F 7/125
(Continued)

(56) References Cited

U.S. PATENT DOCUMENTS 3,081,993 A * 3/1963 Wallerstein, Jr. ..... F16F 1/3713
267/33
3,806,106 A * 4/1974 Hamel .................... F16F 1/371
267/152

(Continued)

FOREIGN PATENT DOCUMENTS

CN   203411189 U     1/2014
DE   2354856 A1 *    5/1975 ............... F16F 1/37
(Continued)

OTHER PUBLICATIONS

International Search Report dated May 16, 2017, in PCT/JP2017/003942 filed Feb. 3, 2017.
(Continued)

*Primary Examiner* — Thomas J Williams
(74) *Attorney, Agent, or Firm* — Xsensus LLP

(57) ABSTRACT

A damper for elevator, and an elevator, that enable reduction of the maximum deceleration of a lifting/lowering body by suppressing deformation of a foamed body for absorbing impact. The damper for elevator includes: urethane foam having a collision surface with which a lifting/lowering body is to collide; and an outer peripheral member attached to the outer side of the side-part surface of the urethane foam and having an inner side surface bowed outward, wherein impact by collision of the lifting/lowering body is buffered by deformations of the urethane foam and the outer peripheral member.

19 Claims, 10 Drawing Sheets

(51) Int. Cl.
*B66B 5/28* (2006.01)
*B32B 5/18* (2006.01)

(58) Field of Classification Search
USPC ............... 267/151, 152, 140.3, 143, 145
See application file for complete search history.

(56) References Cited

U.S. PATENT DOCUMENTS

| | | | |
|---|---|---|---|
| 4,005,858 A | | 2/1977 | Lochner |
| 4,515,248 A | * | 5/1985 | Ohta ................. B66B 5/282 |
| | | | 187/343 |
| 4,601,367 A | * | 7/1986 | Bongers ............. B29D 28/005 |
| | | | 138/174 |
| 7,967,118 B2 | | 6/2011 | Chen et al. |
| 2019/0085928 A1 | * | 3/2019 | Mizumachi .......... F16F 1/3713 |

FOREIGN PATENT DOCUMENTS

| | | | | |
|---|---|---|---|---|
| DE | 2400176 A1 | * | 7/1975 | ............... F16F 1/37 |
| DE | 3925821 A1 | * | 8/1990 | ............ B60R 21/04 |
| DE | 4239460 A1 | * | 5/1994 | ............ B60R 19/34 |
| DE | 102004046925 A1 | * | 4/2006 | ............... F16F 9/58 |
| GB | 808789 A | * | 2/1959 | ............... F16F 1/37 |
| GB | 1058793 A | * | 2/1967 | ............... F16F 1/37 |
| GB | 1063754 A | * | 3/1967 | ............... F16F 1/37 |
| JP | 49-109341 U | | 9/1974 | |
| JP | 10-141408 A | | 5/1998 | |
| JP | 2001-240338 A | | 9/2001 | |
| JP | 2011-073823 A | | 4/2011 | |
| WO | WO-2014077314 A1 | * | 5/2014 | ............ B60R 19/34 |
| WO | WO-2015015747 A1 | * | 2/2015 | ............ B61F 19/04 |

OTHER PUBLICATIONS

Combined Chinese Office Action and Search Report dated Jul. 3, 2019 in Patent Application No. 201780020997.9 (with partial English translation and English translation of categories of cited documents), 19 pages.

Office Action dated Aug. 28, 2019 in Korean Patent Application No. 10-2018-7028908 (with unedited computer generated English translation), 11 pages.

Office Action dated Dec. 29, 2020, in corresponding Indian patent Application No. 201847035988, 5 pages.

Brazilian Office Action dated Oct. 16, 2021, in Brazilian Patent Application No. BR112018070708-2.

Office Action dated Mar. 30, 2022, in corresponding German patent Application No. No. 112017002006.9, 13 pages.

\* cited by examiner

DAMPER FOR ELEVATOR, AND ELEVATOR

TECHNICAL FIELD

The present invention relates to a damper for elevator for buffering impact on a lifting/lowering body such as a car or a balance weight, and an elevator.

BACKGROUND ART

In lifting/lowering machines such as an elevator, a damper for absorbing impact is provided to a pit at the lower end of a hoistway in order to safely stop a lifting/lowering body such as a car or a balance weight. As the damper for elevator, a spring damper or an oil filled damper is often used. However, in recent years, to meet the needs of damper size reduction, pit size reduction, cost reduction, and the like, dampers using a foamed body such as urethane foam have been sometimes used. Conventionally, some of such dampers are formed by filling, with a foamed body such as polyurethane, the inside of a cover made from soft or semi-rigid plastic, rubber, or the like (see, for example, Patent Document 1).

CITATION LIST

Patent Document

Patent Document 1: Japanese Laid-Open Patent Publication No. 10-141408

SUMMARY OF THE INVENTION

Problems to be Solved by the Invention

In the damper of Patent Document 1, a reaction force of a foamed body such as polyurethane foam for absorbing impact increases as deformation due to collision impact progresses, so that the deceleration of the collision body is also increased. Then, at the end of buffering when the collision body stops, the reaction force and the deceleration of the collision body are maximized. The foamed body such as polyurethane foam has a buffering characteristic in which, while the amount of deformation thereof is small, rising of the reaction force is mild, and when the amount of the deformation exceeds a certain amount, the reaction force sharply increases. Therefore, at the time of collision of the lifting/lowering body, the deceleration of the lifting/lowering body is sharply increased by sharp increase in the reaction force due to deformation of the foamed body, thus causing a problem that the maximum deceleration might become excessive.

The present invention has been made to solve the above problem, and an object of the present invention is to obtain a damper for elevator, and an elevator, that enable reduction of the maximum deceleration of a lifting/lowering body by suppressing deformation of a foamed body for buffering impact.

Solution to the Problems

A damper for elevator according to the present invention includes: a foamed body having, at an upper part, a collision surface with which a lifting/lowering body is to collide; and an outer peripheral member which is attached to an outer side of a side-part surface of the foamed body, the outer peripheral member being bowed outward such that a center part thereof in a height direction on a side facing the side-part surface protrudes outward relative to an upper end part that is on the upper part side and on the side facing the side-part surface, and relative to a lower end part that is on a side opposite to the upper part and on the side facing the side-part surface, wherein impact by collision of the lifting/lowering body is buffered by deformations of the foamed body and the outer peripheral member.

Effect Of The Invention

According to the present invention, at the time of collision of the lifting/lowering body, the impact is buffered by the foamed body and the outer peripheral member which is attached to the outer side of the side-part surface of the foamed body, the outer peripheral member being bowed outward such that a center part thereof in a height direction on a side facing the side-part surface protrudes outward relative to an upper end part that is on the upper part side and on the side facing the side-part surface, and relative to a lower end part that is on a side opposite to the upper part and on the side facing the side-part surface, whereby deformation of the foamed body is suppressed and the maximum deceleration of the lifting/lowering body can be reduced.

DESCRIPTION OF EMBODIMENTS

Embodiment 1

Figure 1:
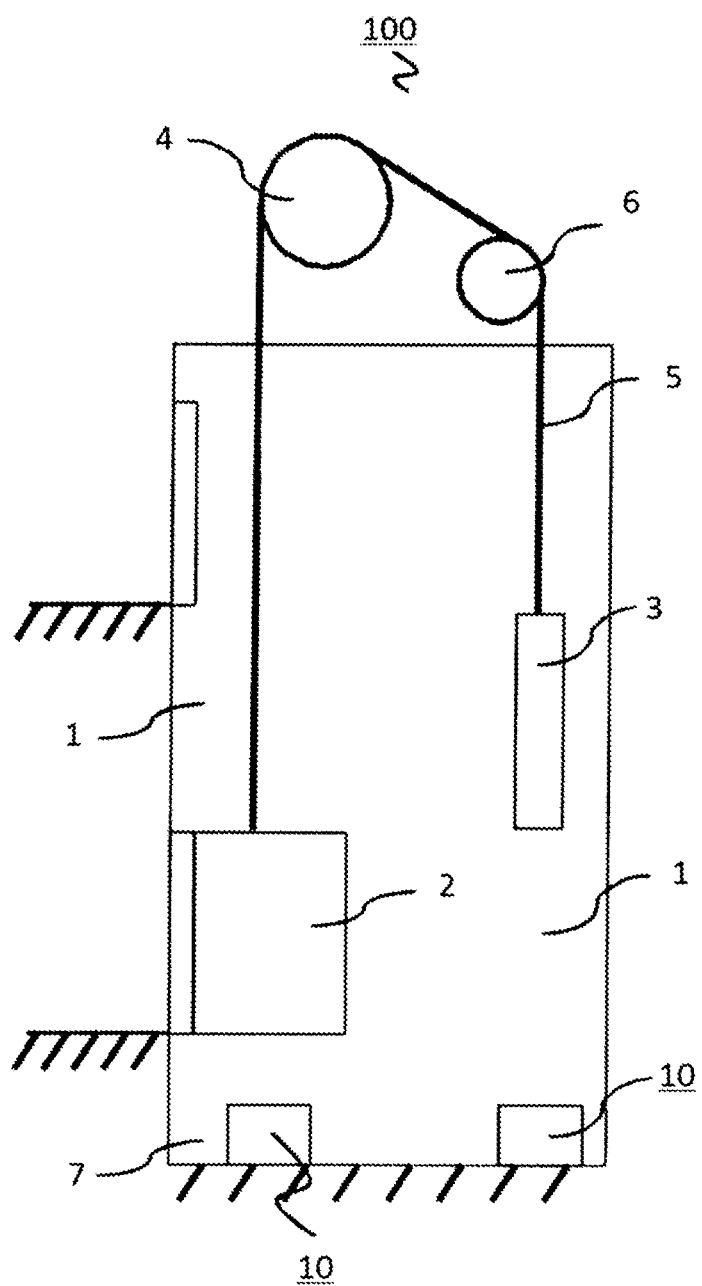
FIG. 1 is a schematic configuration diagram showing the entire configuration of an elevator according to embodiment 1 of the present invention.

Hereinafter, embodiment 1 of the present invention will be described with reference to FIG. 1 to FIG. 7. FIG. 1 is a schematic configuration diagram showing the entire configuration of an elevator according to the present embodiment. As shown in the drawing, in an elevator 100, a car 2 and a balance weight 3, i.e., lifting/lowering bodies are provided inside a hoistway 1 so as to be able to be lifted/lowered. A rope 5 connecting and hanging the car 2 and the balance weight 3 is wound on a drive sheave 4 and a deflector sheave 6 attached to a hoisting device body (not shown) including a motor. The drive sheave 4 is rotated by a driving force of the hoisting device body, to move the rope 5, whereby the car 2 and the balance weight 3 are lifted/lowered inside the hoistway 1.

A pit 7 is formed at the lower end of the hoistway 1, and dampers 10 for elevator are attached to the bottom surface of the pit 7. The dampers 10 for elevator are located under the car 2 and the balance weight 3, respectively. When the car 2 or the balance weight 3 is lowered further from the lowest floor because of some abnormality or the like and collides with the damper 10 for elevator, the damper 10 for elevator buffers impact from the car 2 or the balance weight 3.

Figure 2:
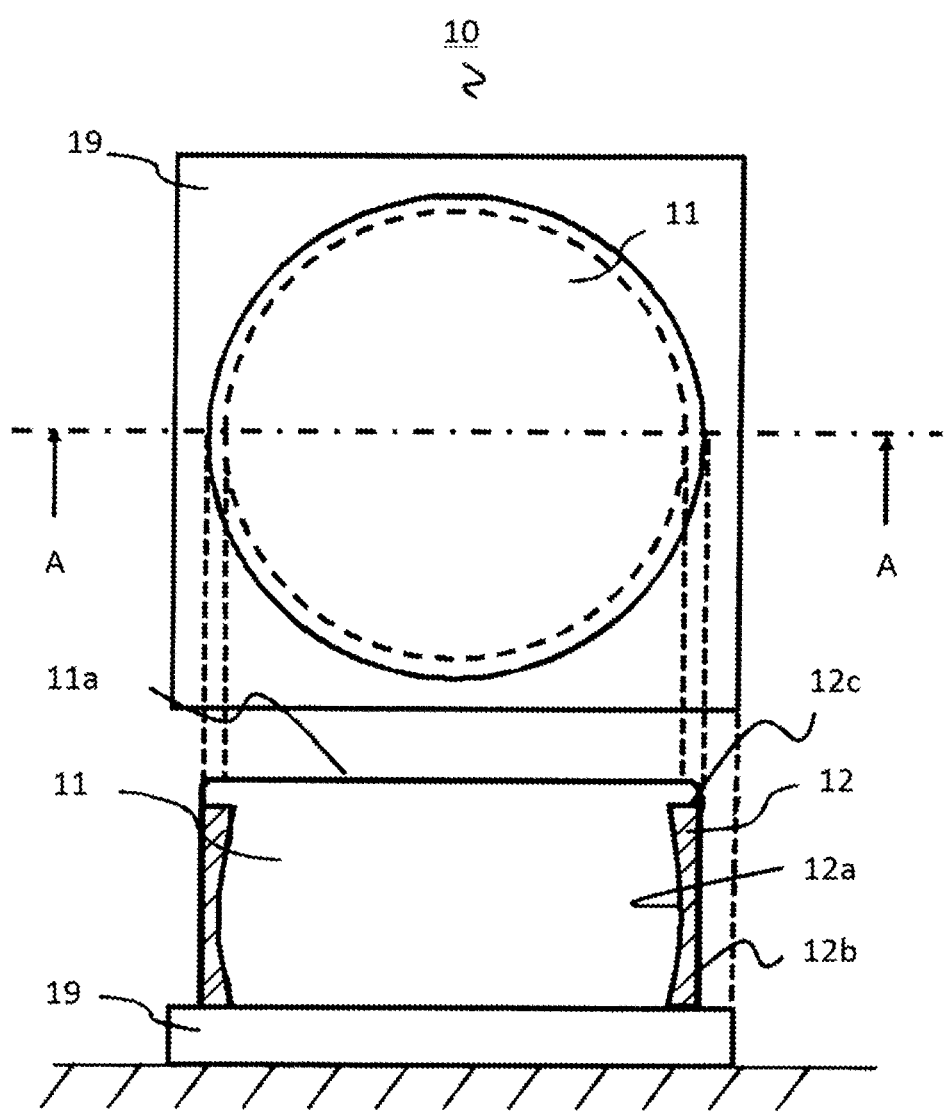
FIG. 2 is a plan view and a sectional view along A-A line of a damper for elevator according to embodiment 1 of the present invention.

FIG. 2 is a plan view and a sectional view along A-A line of the damper for elevator according to the present embodiment. As shown in the drawing, the damper 10 for elevator is formed such that urethane foam 11, i.e., a foamed body is fixed on the upper surface of a support base 19 attached to the pit bottom surface, and around this foamed body, an outer peripheral member 12 which has a hollow cylindrical shape and which is made of carbon fiber reinforced resin is attached around the side-part surface of the urethane foam 11. The urethane foam 11 and the outer peripheral member 12 are integrally formed by molding. The urethane foam 11 has a columnar shape and has a collision surface 11a at the upper surface thereof, and the axial direction of the urethane foam 11 is a buffering direction. Here, urethane foam is used as the foamed body, but without limitation thereto, any soft or semi-rigid foamed body that absorbs impact may be used.

An inner side surface 12a of the outer peripheral member 12, i.e., a surface on the side facing the side-part surface of the urethane foam 11 is formed such that the center part in the height direction is bowed outward of the damper 10 for elevator. On the other hand, an outer side surface 12b thereof is formed such that the distance from the center axis of the urethane foam 11 is constant along the height direction, and therefore the thickness of the center part of the outer peripheral member 12 is smaller than the thicknesses of the upper end part and the lower end part thereof. The height of the outer peripheral member 12 is less than the height of the urethane foam 11, and an upper end surface 12c of the outer peripheral member 12 is covered by the urethane foam 11. The height of the outer peripheral member 12 is not less than 50% of the height of the urethane foam 11. The maximum thickness (thickness of upper end part and lower end part) of the outer peripheral member 12 is not greater than 50% of the height of the urethane foam 11 that is maximally compressed. The amount of deformation of the urethane foam 11 that is maximally compressed is in a range of 50% to 95%. For example, in the case where the maximum compression amount is 90%, the maximum thickness of the outer peripheral member 12 is not greater than 5% of the height of the urethane foam 11.

In the present embodiment, as the outer peripheral member 12, an outer shell which is a shell-like member and which is made of carbon fiber reinforced resin is used. However, without limitation thereto, the outer peripheral member 12 may be formed from a fiber reinforced resin such as glass fiber reinforced resin, a metal such as rolled steel (SS400) or stainless steel (SUS631), or the like so as to have a longitudinal modulus of elasticity (for fiber reinforced resin, compression modulus of elasticity) of about 50 to 200 GPa. The urethane foam 11 and the outer peripheral member 12 are integrally molded. However, the outer peripheral member 12 may be fixed to the urethane foam 11 by an adhesive agency or the like, to form the damper 10 for elevator.

Next, buffering operation of the damper 10 for elevator will be described with reference to FIG. 3A, FIG. 3B, FIG. 3C, FIG. 3D and FIG. 4.

Figure 4:
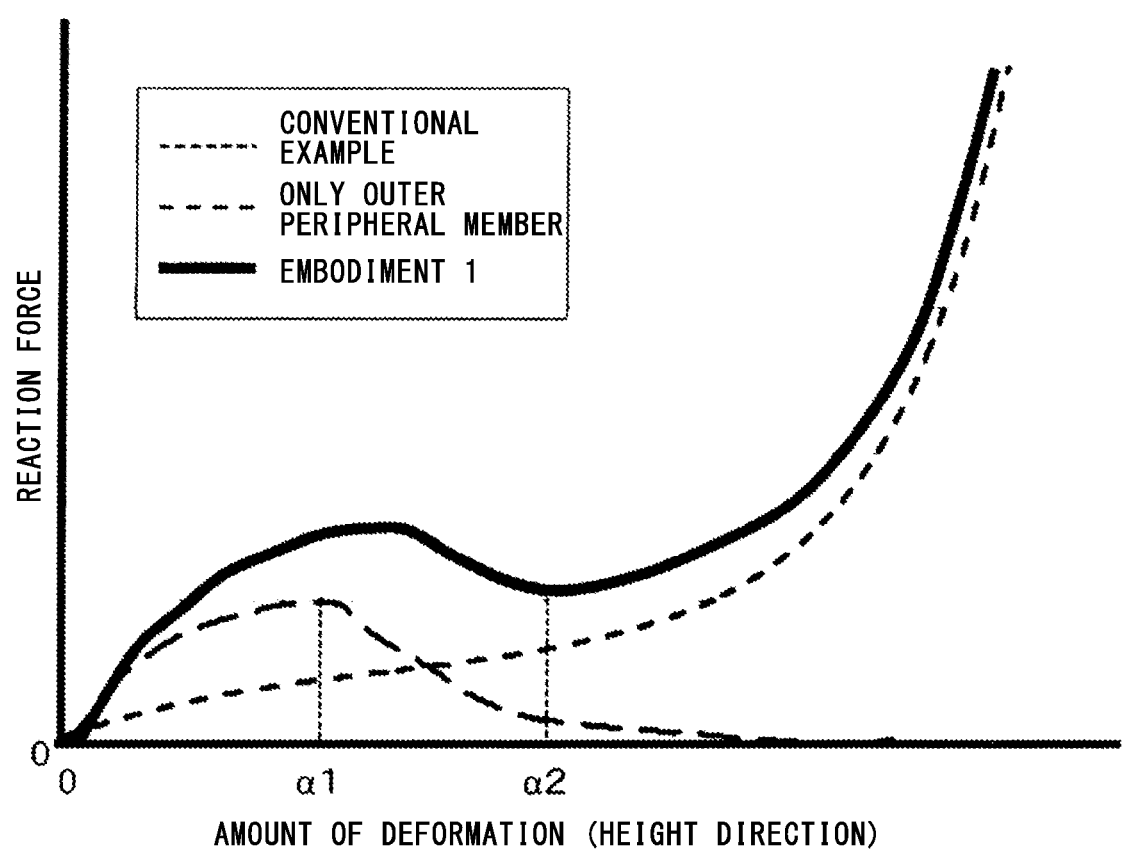
FIG. 4 is a characteristic diagram showing the relationship between the amount of deformation and a reaction force.
Figure 5:
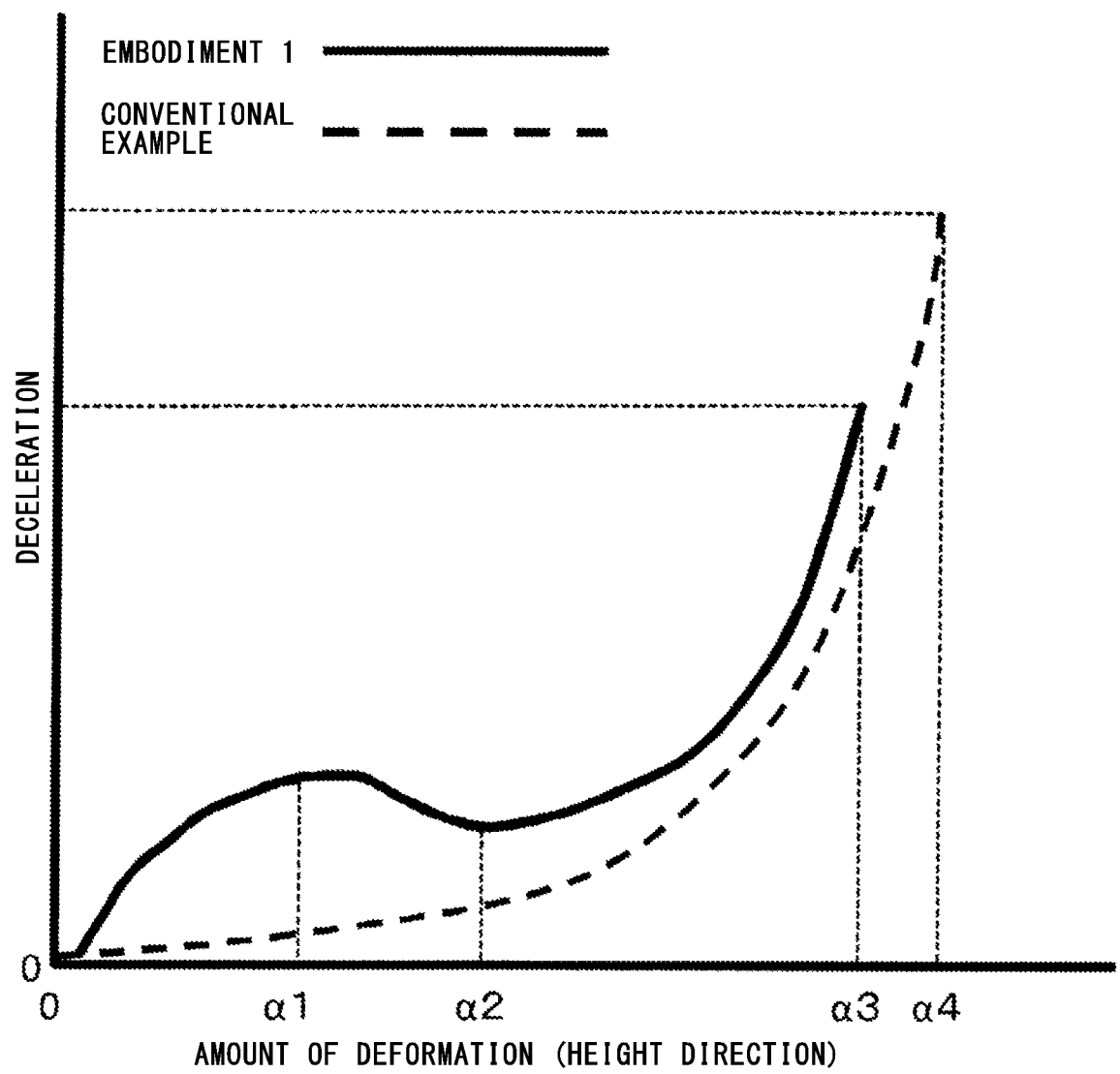
FIG. 5 is a characteristic diagram showing the relationship between the amount of deformation and a deceleration until the end of buffering.

FIG. 3 shows buffering operation of the damper for elevator according to the present embodiment. FIG. 4 is a graph showing the relationship between the amount of deformation in the height direction and a reaction force due to the deformation at the time of collision of the car 2 or the balance weight 3, in each case of a conventional urethane foam damper (conventional example), only the outer peripheral member 12 used in the present embodiment, and the damper 10 for elevator of the present embodiment. FIG. 5 is a graph showing the relationship between the amount of deformation in the height direction and the deceleration of the car 2 or the balance weight 3 colliding with the damper 10 for elevator, in each case of the conventional example and the damper 10 for elevator of the present embodiment. In the description below, the case where the car 2 collides with the damper 10 for elevator will be described, but the same applies to the case of collision of the balance weight 3. For convenience of description, a period from an initial state (amount of deformation is zero) until the amount of deformation reaches α1 is referred to as "initial stage of buffering", a period from when the amount of deformation exceeds α1 until the amount of deformation reaches α2 is referred to as "middle stage of buffering", and a period from when the amount of deformation exceeds α2 until the car 2 stops and the buffering is finished is referred to as "later stage of buffering".

Figure 3A:
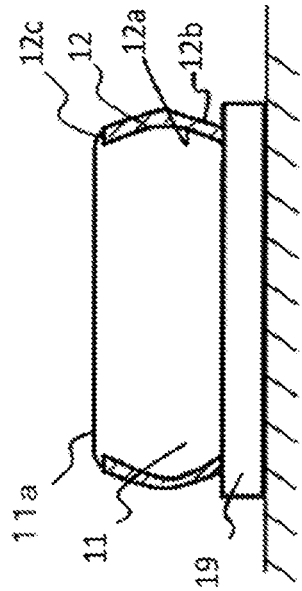
FIG. 3A shows buffering operation of the damper for elevator according to embodiment 1 of the present invention.
Figure 3C:
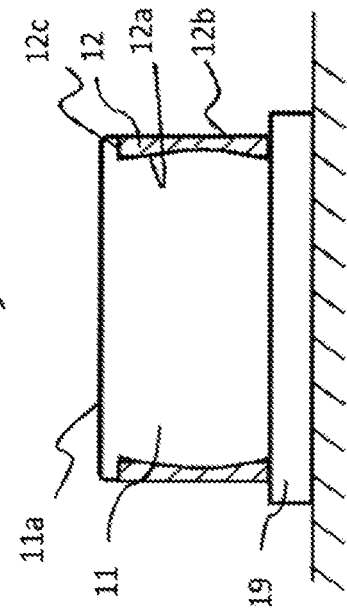
FIG. 3C shows buffering operation of the damper for elevator according to embodiment 1 of the present invention.
Figure 3B:
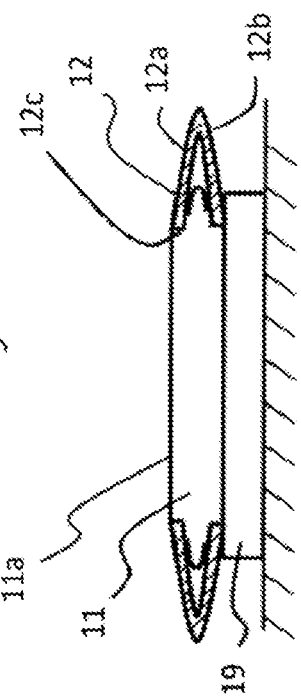
FIG. 3B shows buffering operation of the damper for elevator according to embodiment 1 of the present invention.

When the car 2 collides with the collision surface 11a of the urethane foam 11 provided to the damper 10 for elevator shown in FIG. 3A, the outer peripheral member 12 is subjected to a compressive load from the car 2 via the urethane foam 11 present above the upper end surface 12c. As described above, the inner side surface 12a of the outer peripheral member 12 is bowed outward and thus the outer peripheral member 12 easily undergoes buckling deformation by the compressive load from above. Therefore, from an early stage after collision of the car 2, the center part protrudes outward by buckling deformation as shown in FIG. 3B, thereby absorbing the impact energy of the collision by an amount corresponding to the strain energy of the buckling deformation, and thus buffering the impact. In addition, since also the urethane foam 11 is subjected to the compressive load from the car 2, the urethane foam 11 is compressively deformed so as to bulge outward, thereby absorbing the impact energy by an amount corresponding to the strain energy of the compressive deformation, and thus buffering the impact. However, as shown in FIG. 4, at the initial stage of buffering when the amount of deformation is small immediately after the collision, a reaction force due to the compressive deformation of the urethane foam 11 is smaller as compared to a reaction force due to the buckling deformation of the outer peripheral member 12, and the strain energy of the compressive deformation of the urethane foam 11 is smaller as compared to the strain energy of the buckling deformation of the outer peripheral member 12. Thus, at the initial stage of buffering, the buckling deformation of the outer peripheral member 12 greatly contributes to impact absorption as compared to the compressive deformation of the urethane foam, and the car 2 is decelerated mainly by the buckling deformation of the outer peripheral member 12, whereby the impact is buffered.

Figure 3D:
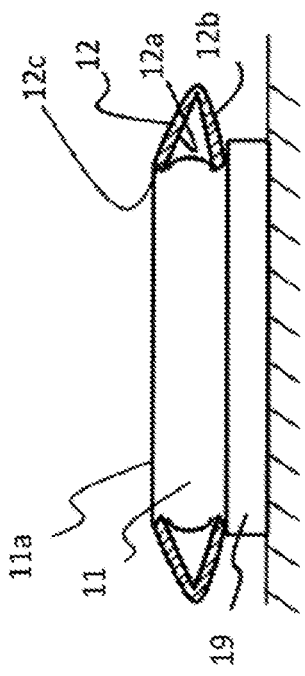
FIG. 3D shows buffering operation of the damper for elevator according to embodiment 1 of the present invention.

When the amount of deformation reaches α1 as the compressive deformation of the urethane foam 11 and the buckling deformation of the outer peripheral member 12 progress, the reaction force of the outer peripheral member 12 is maximized. Also at the subsequent middle stage of buffering, the outer peripheral member 12 is greatly buckled and deformed as shown in FIG. 3C, but the reaction force due to the buckling deformation starts to gradually decrease, and the reaction force of the entire damper 10 for elevator and the deceleration of the car 2 also start to decrease. Meanwhile, the reaction force due to the compressive deformation of the urethane foam 11 starts to greatly increase along with increase in the amount of deformation. Then, when the amount of deformation reaches α2, the amount of increase in the reaction force of the urethane foam 11 exceeds the amount of decrease in the reaction force of the outer peripheral member 12, and thus the reaction force of the entire damper 10 for elevator and the deceleration of the car 2 start to increase again. At this time, the reaction force of the outer peripheral member 12 has become sufficiently smaller as compared to the reaction force of the urethane foam 11. Therefore, as shown in FIG. 3D, at the later stage of buffering when the compressive deformation of the urethane foam 11 and the buckling deformation of the outer peripheral member 12 become further great, the compressive deformation of the urethane foam 11 greatly contributes to impact absorption as compared to the buckling deformation of the outer peripheral member 12, and the car 2 is decelerated mainly by the compressive deformation of the urethane foam 11, whereby the impact is buffered. When the amount of deformation reaches α3, the car 2 stops and thus the buffering is finished.

At the later stage of buffering, the reaction force and the deceleration of the car 2 monotonically increases in accordance with increase in the amount of deformation, and therefore, at the end of buffering when the amount of deformation is maximized, the reaction force and the deceleration of the car 2 are maximized. The amount of deformation of the urethane foam 11 at the later stage of buffering depends on the magnitude of the velocity of the car 2 at the time when the amount of deformation is α2. In the present embodiment, the impact energy of collision of the car 2 is absorbed by the buckling deformation of the outer peripheral member 12 at the initial stage of buffering and the middle stage of buffering and thus the car 2 has been decelerated. Therefore, the urethane foam 11 only has to decelerate and stop the car 2 that has been already decelerated by the buckling deformation of the outer peripheral member 12. Therefore, α3 which is the amount of deformation at the end of buffering in the present embodiment is smaller than α4 which is the amount of deformation at the end of buffering in the conventional example. As a result, in the present embodiment, the deceleration of the car 2 at the end of buffering, i.e., the maximum deceleration becomes smaller as compared to the conventional example.

It is noted that the urethane foam has a characteristic that, at the time of compressive deformation, the diameter thereof increases and the sectional area thereof increases. In the present embodiment, since the outer peripheral member 12 is buckled and deformed outward as described above, increase in the sectional area of the urethane foam 11 is not inhibited and thus the compressive deformation thereof is not prevented.

Figure 6:
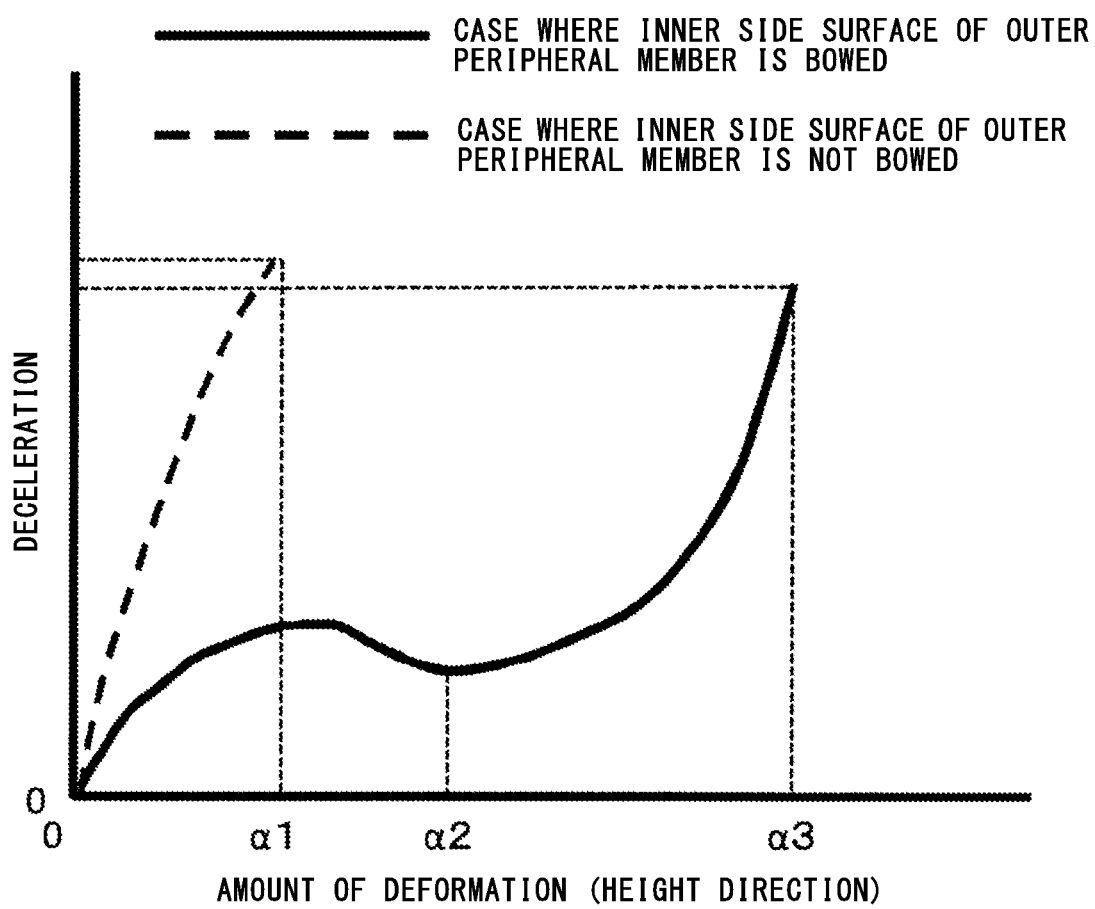
FIG. 6 is a diagram showing difference in deceleration between the case where the inner side surface of an outer peripheral member is bowed outward and the case where the inner side surface is not bowed.

Here, the relationship between the bowing of the inner side surface 12a of the outer peripheral member 12 and the deceleration of the car 2 will be described. FIG. 6 is a diagram showing difference in deceleration between the case where the inner side surface 12a of the outer peripheral member 12 is bowed outward as in the present embodiment, and the case where the inner side surface 12a is not bowed. In the case where the inner side surface 12a is not bowed, the outer peripheral member 12 is deformed so as to be crushed in the compression direction by the compressive load from the car 2, and the reaction force and the deceleration of the car 2 that have risen at the time of collision continue increasing. Therefore, the maximum deceleration is not reduced. On the other hand, in the case where the inner side surface 12a is bowed as in the present embodiment, as described above, the buckling deformation occurs from an early stage after collision of the car 2, and therefore the reaction force and the deceleration of the car 2 that have risen at the time of collision do not continue increasing, unlike the case where the inner side surface 12a is not bowed. Therefore, the maximum deceleration is reduced.

In embodiment 1, at the time of collision of the lifting/lowering body, the impact is buffered by the urethane foam and the outer peripheral member attached around the side-part surface of the urethane foam and having an inner side surface bowed outward, and thus the impact energy of the collision is partially absorbed by buckling deformation of the outer peripheral member. Therefore, energy absorbed by the urethane foam decreases, and thus deformation of the urethane foam is suppressed and the maximum deceleration of the lifting/lowering body that has collided can be reduced. Accordingly, in an energy storage type damper such as a urethane foam damper, it is possible to reduce the maximum deceleration to a predetermined value (for example, 6G) or lower without changing the material of the foamed body or the damper height.

The inner side surface of the outer peripheral member is bowed outward of the damper for elevator. Therefore, when subjected to a compressive load, the outer peripheral member is easily buckled and deformed outward, but does not undergo such deformation as to be crushed in the compression direction. In addition, at the time of compressive deformation, compressive deformation of the urethane foam bulging outward is not prevented.

The height of the outer peripheral member is less than the height of the urethane foam, and the upper end surface of the outer peripheral member is covered by the urethane foam. Therefore, the bottom surface of the lifting/lowering body and the outer peripheral member both of which are made from rigid materials do not directly collide with each other and thus the outer peripheral member can be prevented from being broken by the impact before causing buckling deformation. In addition, the bottom surface of the lifting/lowering body can be also prevented from being damaged.

The urethane foam has a nonlinear compression characteristic, and in general, the reaction force thereof sharply increases when the amount of deformation relative to the pre-deformation height exceeds 50%. However, in the present embodiment, since the height of the outer peripheral member is not less than 50% of the height of the urethane foam, buffering by buckling deformation of the outer peripheral member is started before the reaction force of the urethane foam starts to sharply increase. Therefore, it is possible to prevent such a phenomenon that, before buffering by buckling deformation of the outer peripheral member, a great reaction force occurs by compressive deformation of the urethane foam and the deceleration of the lifting/lowering body becomes excessive.

When buckling deformation of the outer peripheral member 12 becomes great, there is a possibility that the outer peripheral member 12 is folded so that the upper half and the lower half thereof overlap each other. When the outer peripheral member 12 is thus folded, the inner side surfaces thereof are pressed by each other and the buffering ability is lost. Therefore, if the folded outer peripheral member 12 becomes higher than the urethane foam 11 and comes into contact with the car 2, the reaction force and the deceleration might become excessive. However, in the present embodiment, as described in paragraph [0012], the maximum thickness of the outer peripheral member 12 is not greater than 50% of the height of the urethane foam 11 that is maximally compressed. Therefore, such a situation that the reaction force and the deceleration become excessive by contact between the folded outer peripheral member 12 and the car 2 does not occur.

Figure 7:
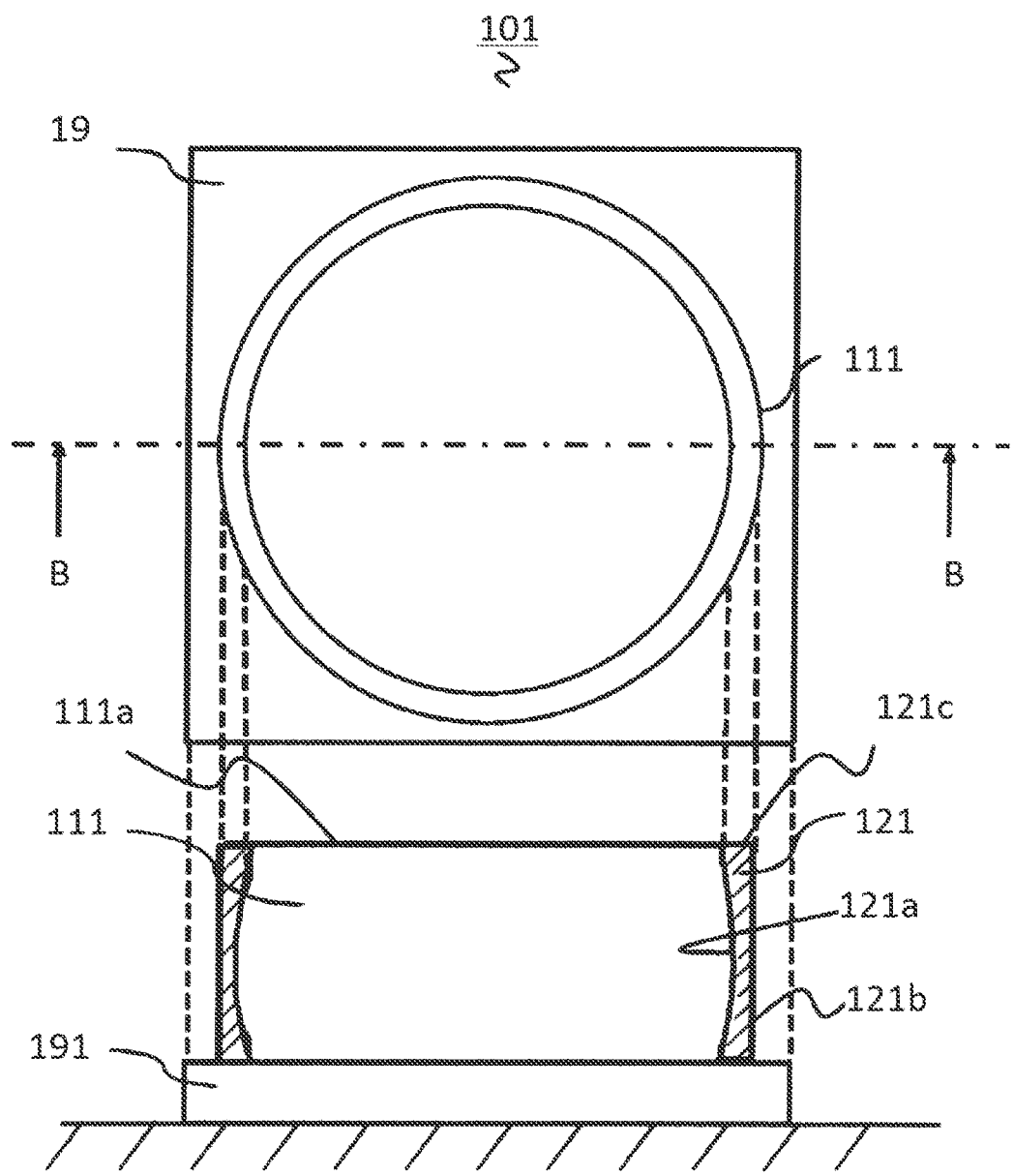
FIG. 7 is a plan view and a sectional view along B-B line of a damper for elevator according to a modification of embodiment 1 of the present invention.

Hereinafter, a modification of embodiment 1 will be described with reference to FIG. 7. In a damper 101 for elevator, urethane foam 111 and an outer peripheral member 121 have the same height, an upper end surface 121c of the outer peripheral member 121 is exposed, and a collision surface 111a and the upper end surface 121c are flush with each other. The other points are the same as in embodiment 1, and an inner side surface 121a, an outer side surface 121b, and a support base 191 correspond to the inner side surface 12a, the outer side surface 12b, and the support base 19, respectively.

Embodiment 2

Figure 8:
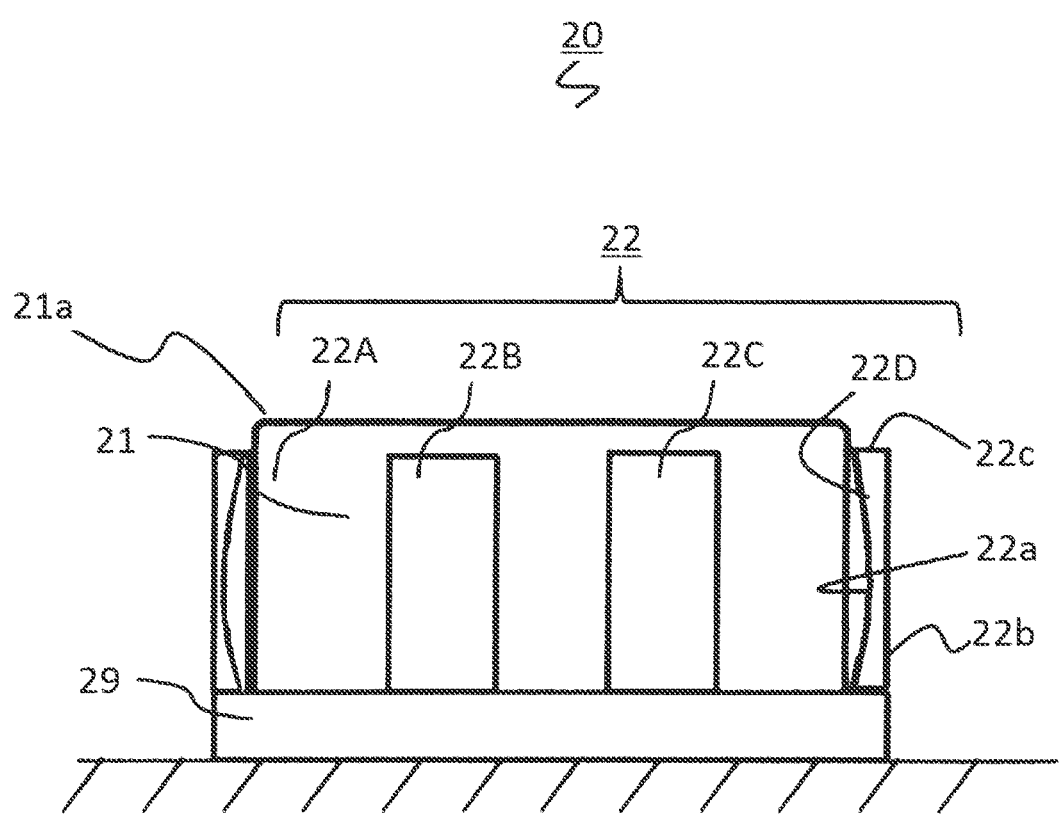
FIG. 8 is a side view of a damper for elevator according to embodiment 2 of the present invention.

Hereinafter, embodiment 2 of the present invention will be described with reference to FIG. 8. It is noted that parts that are the same as or correspond to those in FIG. 1 to FIG. 6 are denoted by the same reference characters and the description thereof is omitted. FIG. 8 is a side view of a damper for elevator according to the present embodiment. As shown in the drawing, a damper 20 for elevator is formed such that an outer peripheral member 22 is attached around the side-part surface of urethane foam 21 fixed to the upper surface of a support base 29 attached to the pit bottom surface. The urethane foam 21 has a columnar shape and has a collision surface 21a at the upper surface thereof, as in the urethane foam 11 of embodiment 1.

The outer peripheral member 22 is composed of four plate-shaped members 22A to 22D made of carbon fiber reinforced resin, which are arranged so as to be spaced from each other and are fixed to the side-part surface of the urethane foam 21 by means of adhesion or the like. An inner side surface 22a (surface facing the urethane foam 21) of each plate-shaped member 22A to 22D is formed such that the center part in the height direction is bowed outward of the damper 20 for elevator. On the other hand, an outer side surface 22b thereof (surface on the side opposite to the inner side surface 22a) is formed such that the distance from the center axis of the urethane foam 21 is constant along the height direction, and therefore the thickness of the center part of each plate-shaped member 22A to 22D is smaller than the thicknesses of the upper end part and the lower end part thereof. As in embodiment 1, the height of the plate-shaped members 22A to 22D is less than the height of the urethane foam 21, and is not less than 50% of the height of the urethane foam 21. Each upper end surface 22c is exposed. Also the maximum thickness (thickness of upper end part and lower end part) of the plate-shaped members 22A to 22D is not greater than 50% of the height of the urethane foam 21 that is maximally compressed, as in embodiment 1.

Here, the outer peripheral member 22 is composed of four plate-shaped members 22A to 22D. However, the number of plate-shaped members composing the outer peripheral member 22 is not limited to four, and also, the width of the plate-shaped members and the interval between the adjacent plate-shaped members are not specifically limited. In addition, as in embodiment 1, the material for the plate-shaped members 22A to 22D is not limited to carbon fiber reinforced resin. Further, in the present embodiment, the outer peripheral member 22 may be formed by using plate-shaped members 22A to 22D made of materials different from each other in combination.

The operation is the same as in embodiment 1, and therefore the description thereof is omitted.

In embodiment 2, the same effects as in embodiment 1 can be obtained.

In addition, since the outer peripheral member can be formed by combining a plurality of plate-shaped members, the manufacturing is facilitated.

Embodiment 3

Figure 9:
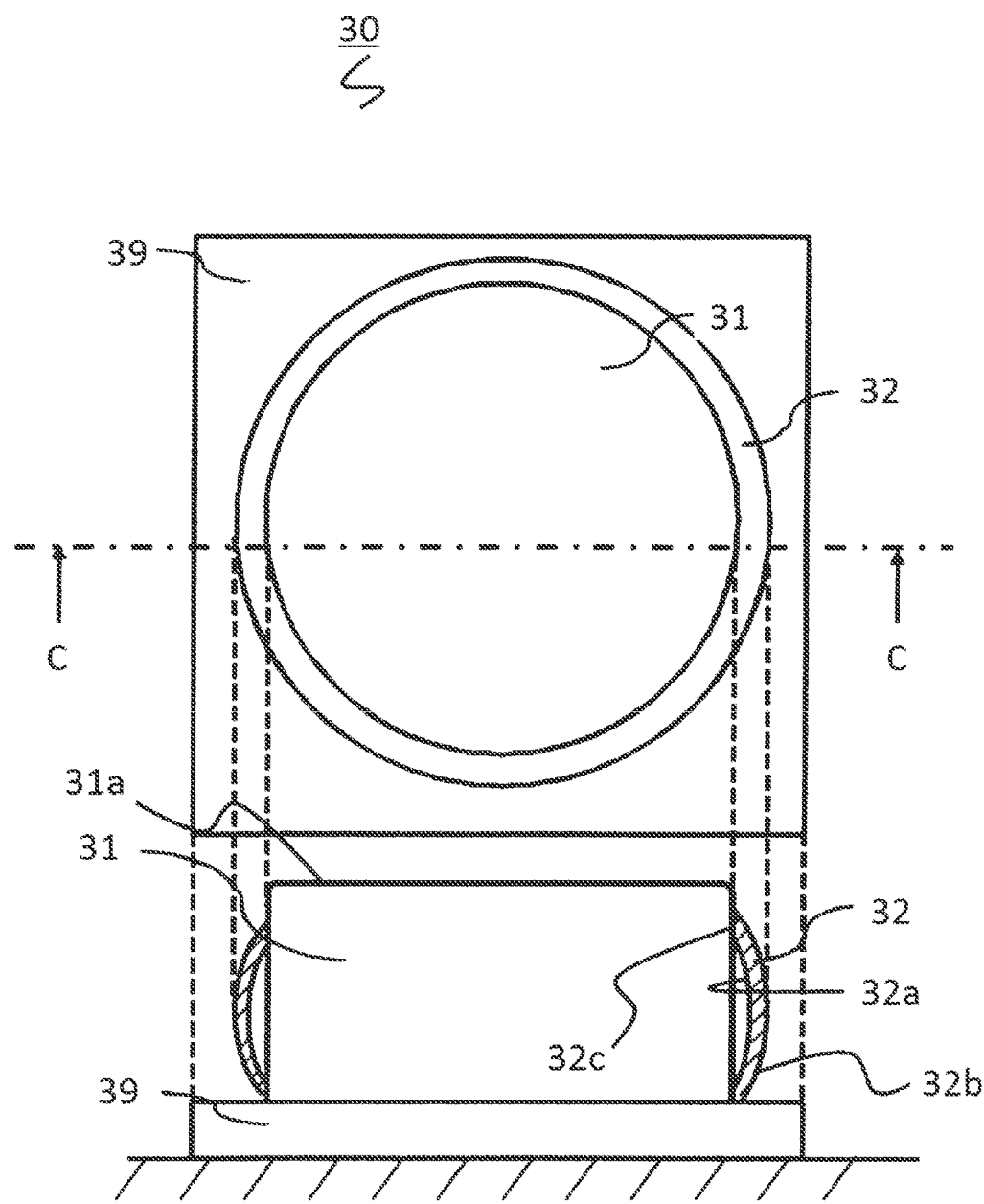
FIG. 9 is a plan view and a sectional view along C-C line of a damper for elevator according to embodiment 3 of the present invention.

Hereinafter, embodiment 3 of the present invention will be described with reference to FIG. 9. It is noted that parts that are the same as or correspond to those in FIG. 1 and FIG. 6 are denoted by the same reference characters, and the description thereof is omitted. FIG. 9 is a plan view and a sectional view along C-C line of a damper for elevator according to the present embodiment. As shown in the drawing, a damper 30 for elevator is formed such that an outer peripheral member 32 which has a hollow cylindrical shape and which is made of carbon fiber reinforced resin is provided standing around urethane foam 31 fixed to the upper surface of a support base 39 attached to the pit bottom surface. The urethane foam 31 and the outer peripheral member 32 are integrally formed by molding. The urethane foam 31 has a columnar shape and has a collision surface 31a at the upper surface thereof, as in the urethane foam 11 of embodiment 1.

An inner side surface 32a (surface facing the urethane foam 31) and an outer side surface 32b (surface on the side opposite to the inner side surface 32a) of the outer peripheral member 32 are bowed outward of the damper 30 for elevator along the height direction, and the thickness of the outer peripheral member 32 is uniform. An upper end surface 32c of the outer peripheral member 32 is fixed to the side-part surface of the urethane foam 31. As in embodiment 1, the height of the outer peripheral member 32 is less than the height of the urethane foam 31, and is not less than 50% of the height of the urethane foam 31. Also the thickness of the outer peripheral member 32 is not greater than 50% of the height of the urethane foam 31 that is maximally compressed, as in embodiment 1. In addition, as in embodiment 1, the material for the outer peripheral member 32 is not limited to carbon fiber reinforced resin.

The operation is the same as in embodiment 1, and therefore the description thereof is omitted.

In embodiment 3, the same effects as in embodiment 1 can be obtained.

In addition, since the thickness of the outer peripheral member is uniform, processing thereof can be easily performed and the manufacturing is facilitated.

Embodiment 4

Figure 10:
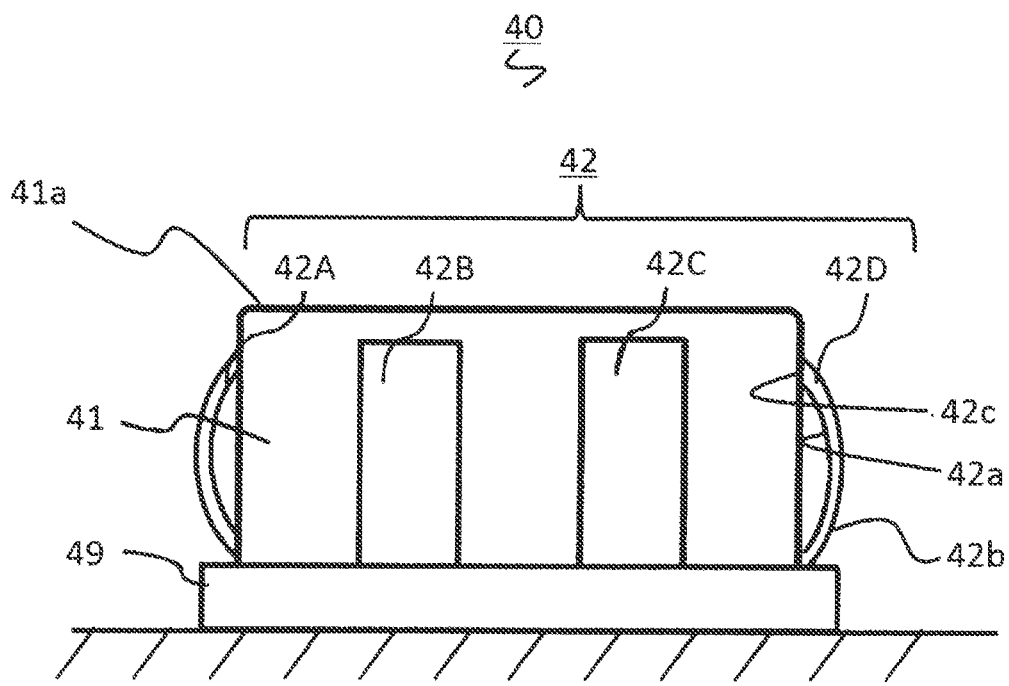
FIG. 10 is a side view of a damper for elevator according to embodiment 4 of the present invention.

Hereinafter, embodiment 4 of the present invention will be described with reference to FIG. 10. It is noted that parts that are the same as or correspond to those in FIG. 1 and FIG. 6 are denoted by the same reference characters, and the description thereof is omitted. FIG. 10 is a side view of a damper for elevator according to the present embodiment. As shown in the drawing, a damper 40 for elevator is formed such that an outer peripheral member 42 is attached around urethane foam 41 fixed to the upper surface of a support base 49 attached to the pit bottom surface. The urethane foam 41 has a columnar shape and has a collision surface 41*a* at the upper surface thereof, as in the urethane foam 11 of embodiment 1.

The outer peripheral member 42 is composed of four plate-shaped members 42A to 42D made of carbon fiber reinforced resin, which are arranged so as to be spaced from each other and are fixed to the side-part surface of the urethane foam 41 by means of adhesion or the like. An inner side surface 42*a* (surface facing the urethane foam 41) and an outer side surface 42*b* (surface on the side opposite to the inner side surface 42*a*) of each plate-shaped member 42A to 42D are bowed outward from the urethane foam 41 along the height direction, and the thickness of each plate-shaped member 42A to 42D is uniform. As in embodiment 1, the height of the plate-shaped members 42A to 42D is less than the height of the urethane foam 41, and is not less than 50% of the height of the urethane foam 41. Each upper end surface 42*c* is fixed to the side-part surface of the urethane foam 41 by means of adhesion or the like. Also the thickness of the plate-shaped members 42A to 42D is not greater than 50% of the height of the urethane foam 41 that is maximally compressed, as in embodiment 1.

Here, the outer peripheral member 42 is composed of four plate-shaped members 42A to 42D. However, the number of plate-shaped members composing the outer peripheral member 42 is not limited to four, and also, the width of the plate-shaped members and the interval between the adjacent plate-shaped members are not specifically limited. In addition, as in embodiment 1, the material for the plate-shaped members 42A to 42D is not limited to carbon fiber reinforced resin, and as in embodiment 2, the outer peripheral member 42 may be formed by using plate-shaped members 42A to 42D made of materials different from each other in combination.

The operation is the same as in embodiment 1, and therefore the description thereof is omitted.

In embodiment 4, the same effects as in embodiment 2 can be obtained.

In addition, since the thickness of the outer peripheral member is uniform, processing thereof can be easily performed and the manufacturing is facilitated.

Embodiment 5

Figure 11:
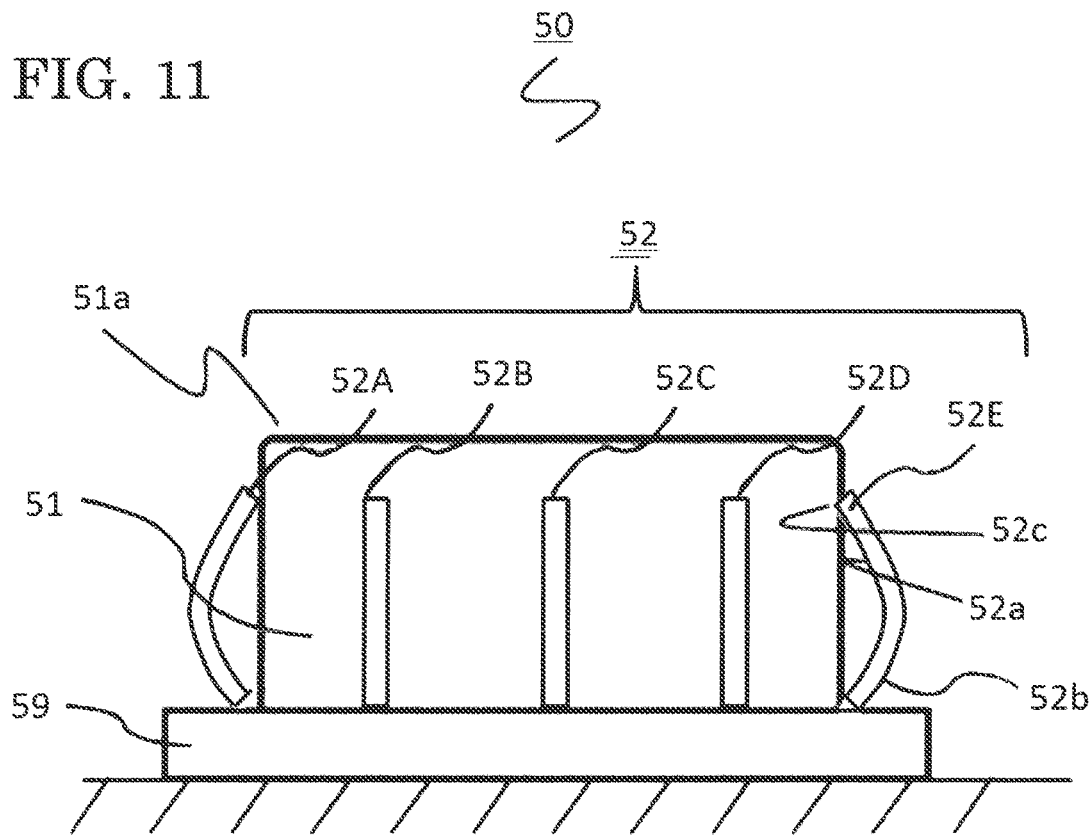
FIG. 11 is a side view of a damper for elevator according to embodiment 5 of the present invention.

Hereinafter, embodiment 5 of the present invention will be described with reference to FIG. 11. It is noted that parts that are the same as or correspond to those in FIG. 1 and FIG. 6 are denoted by the same reference characters, and the description thereof is omitted. FIG. 11 is a side view of a damper for elevator according to the present embodiment. As shown in the drawing, a damper 50 for elevator is formed such that an outer peripheral member 52 is attached around urethane foam 51 fixed to the upper surface of a support base 59 attached to the pit bottom surface. The urethane foam 51 has a columnar shape and has a collision surface 51*a* at the upper surface thereof, as in the urethane foam 11 of embodiment 1.

The outer peripheral member 52 is composed of five columnar members 52A to 52E made of carbon fiber reinforced resin, which are arranged so as to be spaced from each other and are fixed to the side-part surface of the urethane foam 51 by means of adhesion or the like. A side-surface inner side 52*a* (side facing the urethane foam 51) and a side-surface outer side 52*b* (side opposite to the side-surface inner side 52*a*) of each columnar member 52A to 52E are bowed outward from the urethane foam 51 along the height direction, and the diameters of the columnar members 52A to 52E are uniform. In the present embodiment, the diameter of each columnar member 52A to 52E corresponds to the thickness of the outer peripheral member 52 composed of the columnar members 52A to 52E. As in embodiment 1, the height of the columnar members 52A to 52E is less than the height of the urethane foam 41, and is not less than 50% of the height of the urethane foam 51. Each upper end surface 52*c* is fixed to the side-part surface of the urethane foam 51 by means of adhesion or the like. The thickness of the outer peripheral member 52, i.e., the diameter of each columnar member 52A to 52E is not greater than 50% of the height of the urethane foam 41 that is maximally compressed, as in embodiment 1.

Here, the outer peripheral member 52 is composed of five columnar members 52A to 52E. However, the number of columnar members composing the outer peripheral member 52 is not limited to five, and also, the interval between the adjacent columnar members is not specifically limited. In addition, as in embodiment 1, the material for the columnar members 52A to 52E is not limited to carbon fiber reinforced resin, and as in embodiment 2, the outer peripheral member 52 may be formed by using columnar members 52A to 52E made of materials different from each other in combination.

The operation is the same as in embodiment 1, and therefore the description thereof is omitted.

In embodiment 5, the same effects as in embodiment 2 can be obtained.

In addition, since the outer peripheral member is composed of columnar members having uniform diameters, processing thereof can be easily performed and the manufacturing is facilitated.

In the above embodiments, the urethane foam has a columnar shape. However, without limitation thereto, urethane foam having a prismatic shape may be used. As for the outer peripheral member, the shape and the arrangement may be selected as appropriate in accordance with the outer periphery of the urethane foam so that the outer peripheral member can be attached around the side-part surface of the urethane foam.

The inner side surface of the outer peripheral member is bowed outward of the damper for elevator so that the outer peripheral member can be buckled and deformed outward at the time of collision of the lifting/lowering body. However, without limitation thereto, the outer side surface of the outer peripheral member may be bowed inward of the damper for elevator. In this case, the outer peripheral member is buckled and deformed inward at the time of collision of the lifting/lowering body, and therefore the outer peripheral member is arranged with a predetermined-width interval provided between the outer peripheral member and the foamed body.

It is noted that, within the scope of the present invention, the above embodiments may be freely combined with each other, or each of the above embodiments may be modified or simplified as appropriate.

DESCRIPTION OF THE REFERENCE CHARACTERS 1 hoistway
2 car (lifting/lowering body)
3 balance weight (lifting/lowering body)
7 pit
10, 101, 20, 30, 40, 50 damper for elevator
11, 111, 21, 31, 41, 51 urethane foam (foamed body)
11a, 111a, 21a, 31a, 41a, 51a collision surface
12, 121, 22, 32, 42, 52 outer peripheral member
12a, 121a, 22a, 32a, 42a inner side surface
52a side-surface inner side
12b, 121b, 22b, 32b, 42b outer side surface
52b side-surface outer side
12c, 121c, 22c, 32c, 42c, 52c upper end surface
22A to 22D, 42A to 42D plate-shaped member
52A to 52E columnar member
100 elevator

The invention claimed is:

1. A damper for elevator comprising:
a foamed body having, at an upper part, a collision surface with which a lifting/lowering body is to collide; and
an outer peripheral member which is attached to an outer side of a side-part surface of the foamed body, the outer peripheral member being bowed outward such that a center part thereof in a height direction on a side facing the side-part surface protrudes outward relative to an upper end part that is on the upper part side and on the side facing the side-part surface, and relative to a lower end part that is on aside opposite to the upper part and on the side facing the side-part surface, wherein
an upper end surface of the outer peripheral member is covered by the foamed body, and
impact by collision of the lifting/lowering body is buffered by compressive deformations of the foamed body and buckling deformation of the outer peripheral member.

2. The damper for elevator according to claim 1, wherein a height of the outer peripheral member is not less than 50% of a height of the foamed body.

3. The damper for elevator according to claim 1, wherein an outward-direction thickness of the outer peripheral member is not greater than 50% of a height of the foamed body that is maximally compressed.

4. The damper for elevator according to claim 1, wherein an outward-direction thickness of the outer peripheral member is uniform.

5. The damper for elevator according to claim I. wherein the outer peripheral member has a hollow cylindrical shape.

6. An elevator comprising:
a lifting/lowering body capable of being lifted/lowered in a hoistway; and
the damper for elevator according to claim 1, the damper for elevator being provided at a lower end part of the hoistway and located under the liffing/lowering body.

7. The damper for elevator according to claim 1, wherein the outer peripheral member is made of carbon fiber reinforced resin.

8. The damper for elevator according to claim 1, wherein a size of the foamed body in the height direction is greater than a size of the outer peripheral member in the height direction.

9. The damper for elevator according to claim 1, wherein the buckling deformation of the outer peripheral member is configured to occur at the center part of the outer peripheral member in the height direction.

10. A damper for elevator comprising:
a foamed body having, at an upper part, a collision surface with which a lifting/lowering body is to collide; and
an outer peripheral member which is attached to an outer side of a side-part surface of the foamed body and of which a side facing the side-part surface is bowed outward, wherein
a height of the outer peripheral member is not greater than a height of the foamed body,
impact by collision of the lifting/lowering body is buffered by compressive deformations of the foamed body and buckling deformation of the outer peripheral member, and
a thickness of the outer peripheral member is smallest at a center part of the outer peripheral member in the height direction and gradually increases towards an upper end part of the outer peripheral member that is on the upper part side of the outer peripheral member and a lower end part of the outer peripheral member that is on a side of the outer peripheral member that is opposite to the upper part.

11. The damper for elevator according to claim 10, wherein
an upper end surface of the outer peripheral member is covered by the foamed body.

12. The damper for elevator according to claim 10, wherein the outer peripheral member is made of carbon fiber reinforced resin.

13. A damper for elevator comprising:
a foamed body having, at an upper part, a collision surface with which a lifting/lowering body is to collide; and
an outer peripheral member which is attached to an outer side of a side-part surface of the foamed body and of which a side facing the side-part surface is bowed outward, wherein
the outer peripheral member is composed of a plurality of plate-shaped members arranged so as to be spaced from each other along a circumference of the foamed body, and
impact by collision of the lifting/lowering body is buffered by compressive deformations of the foamed body and buckling deformation of the outer peripheral member.

14. The damper for elevator according to claim 13, wherein
the outer peripheral member is composed of a plurality of columnar members arranged so as to be spaced from each other.

15. The damper for elevator according to claim 13, wherein
each of the plurality of plate-shaped members has a rectangular shape, with a longer side of the rectangular shape arranged along the height direction.

16. The damper for elevator according to claim 13, wherein each of the plurality of plate-shaped members has a flat side arranged away from the foamed body and a curved side arranged toward the foamed body.

17. The damper for elevator according to claim 13, wherein the outer peripheral member is made of carbon fiber reinforced resin.

18. The damper for elevator according to claim 13, wherein a thickness of each of the plurality of plate-shaped members is smallest at a center part of the plate-shaped member in the height direction and gradually increases towards an upper end part of the outer peripheral member and a lower end part of the outer peripheral member.

19. The damper for elevator according to claim 13, wherein an outward-direction thickness of the outer peripheral member is uniform.

* * * * *